United States Patent
Ekelund et al.

(10) Patent No.: US 11,879,544 B2
(45) Date of Patent: Jan. 23, 2024

(54) METHOD FOR AVOIDING ACTIVATION OF A SAILING FUNCTIONALITY, A TRANSMISSION SYSTEM AND A VEHICLE COMPRISING A TRANSMISSION SYSTEM

(71) Applicants: Ningbo Geely Automobile Research & Development Co., Ltd., Ningbo (CN); Zhejiang Geely Holding Group Co., Ltd., Zhejiang (CN)

(72) Inventors: Johan Ekelund, Gothenburg (SE); Farshid Shafiabady, Gothenburg (SE)

(73) Assignees: NINGBO GEELY AUTOMOBILE RESEARCH & DEV. CO., LTD., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 0 days.

(21) Appl. No.: 18/128,087

(22) Filed: Mar. 29, 2023

(65) Prior Publication Data
US 2023/0235818 A1    Jul. 27, 2023

Related U.S. Application Data

(63) Continuation of application No. PCT/CN2021/122125, filed on Sep. 30, 2021.

(30) Foreign Application Priority Data

Oct. 7, 2020  (EP) .................................. 20200554

(51) Int. Cl.
*F16H 61/02*       (2006.01)
*F16H 59/02*       (2006.01)
(Continued)

(52) U.S. Cl.
CPC ..... *F16H 61/0213* (2013.01); *F16H 59/0204* (2013.01); *F16H 59/70* (2013.01);
(Continued)

(58) Field of Classification Search
CPC .............................................. F16H 2061/0237
See application file for complete search history.

(56) References Cited

U.S. PATENT DOCUMENTS

| | | |
|---|---|---|
| 5,161,432 A | 11/1992 | Matsumoto |
| 2010/0100290 A1 | 4/2010 | Sauter |

(Continued)

FOREIGN PATENT DOCUMENTS

| | | |
|---|---|---|
| CN | 102211578 A | 10/2011 |
| JP | 2006160012 A | 6/2006 |
| WO | 2014064521 A2 | 5/2014 |

OTHER PUBLICATIONS

International Search Report from corresponding International Application No. PCT/CN2021/122125, dated Dec. 30, 2021, 2 pages.

*Primary Examiner* — Timothy Hannon
(74) *Attorney, Agent, or Firm* — Tucker Ellis LLP (57) ABSTRACT

A transmission system avoids activation of a sailing functionality in a vehicle. The transmission system is configured for automatic gear-shifting in an automatic mode and manual gear-shifting by a user in a manual mode. The transmission system includes a user input device configured for manually changing the operational mode between the automatic and manual modes. The transmission system includes a transmission control unit for determining a recommended gear in the automatic and manual modes. In the manual mode, an operating gear of the transmission system is detected by the transmission control unit. A change of the operational mode from manual to automatic by means of the user input device is detected, and if the detected operating gear in the manual mode when changing to automatic mode (Continued)

is lower than the recommended gear, the sailing functionality in the automatic mode is deactivated.

17 Claims, 4 Drawing Sheets

(51) Int. Cl.
*F16H 59/70* (2006.01)
*F16H 61/16* (2006.01)
*F16H 61/21* (2006.01)

(52) U.S. Cl.
CPC .............. *F16H 61/16* (2013.01); *F16H 61/21* (2013.01); *F16H 2059/0221* (2013.01); *F16H 2061/0237* (2013.01)

(56) References Cited

U.S. PATENT DOCUMENTS

| | | |
|---|---|---|
| 2012/0245810 A1 | 9/2012 | Staudinger |
| 2013/0297159 A1 | 11/2013 | Nishida |
| 2014/0088858 A1 | 3/2014 | Stefan |
| 2016/0009287 A1 | 1/2016 | Pasenau |
| 2017/0313316 A1 | 11/2017 | Shiraishi |
| 2018/0313415 A1 | 11/2018 | Rothmund |

METHOD FOR AVOIDING ACTIVATION OF A SAILING FUNCTIONALITY, A TRANSMISSION SYSTEM AND A VEHICLE COMPRISING A TRANSMISSION SYSTEM

RELATED APPLICATION DATA

This application is a continuation of International Patent Application No. PCT/CN2021/122125, filed Sep. 30, 2021, which claims the benefit of European Patent Application No. 20200554.2, filed Oct. 7, 2020, the disclosures of which are incorporated herein by reference in their entireties.

TECHNICAL FIELD

The present disclosure relates to a method for avoiding activation of a sailing functionality in a vehicle, where the vehicle comprises a powertrain with a transmission system. The transmission system is configured for automatic gear-shifting in an operational automatic mode and manual gear-shifting by a user of the vehicle in an operational manual mode. The transmission system comprises a user input device configured for manually changing the operational mode of the transmission system between the automatic mode and the manual mode. The transmission system comprises a transmission control unit for determining a recommended gear in the automatic mode and the manual mode. The disclosure further relates to a transmission system of a vehicle for avoiding activation of a sailing functionality, and a vehicle comprising a transmission system for avoiding activation of a sailing functionality.

BACKGROUND

Many new vehicles with automatic transmissions features a so-called sailing or eco-coasting functionality when the vehicle is operated in an automatic transmission mode. This functionality allows the combustion engine to be disconnected from the driving wheels in a sailing mode of the vehicle. The sailing mode is activated during deceleration to allow further travel distance and reduced total fuel consumption without accelerator pedal input, and the deceleration rate is reduced since no engine braking is taking place in the sailing mode. The feature is for many vehicles automatically activated when the accelerator pedal is released while speed is above a certain threshold level and no brake is applied. The feature is suitable when the lowered deceleration rate is desired. However, when a driver of the vehicle deems that a higher deceleration rate is necessary, applying a brake pedal is disengaging the sailing functionality and the engine is re-connected to the driving wheels, thus entering a deceleration fuel cut mode during engine braking. Having to apply the brakes to regain engine braking is inherently inefficient since the driver of the vehicle needs to apply the brake pedal with resulting unnecessary energy consumption in the brake system of the vehicle in order to return to engine braking when increased deceleration is desired. An alternative way presented in most vehicles to overcome the need to apply brake pedal to cancel the sailing mode is to move a transmission shift lever into a manual gear-shift mode. This method is only useful at higher speeds such as highway driving where a top gear is always available and preferred by the vehicle systems. If this manual method is applied at lower speeds, it requires constant driver inputs as the necessary downshift required during deceleration will often not be performed automatically when the transmission is in the manual mode. The driver thus has to keep shifting gears up and down manually if the sailing functionality is not desired. Another flaw in the manual gear-shift mode is that sliding the shift lever back to automatic mode, to avoid having to manually down-shift while decelerating, will result in the reactivation of the sailing functionality, thus leading to unnecessary energy consumption in the brake system when applying the brake pedal to engage engine braking.

There is thus a need for an improved way of avoiding activation of the sailing functionality, for a simple and efficient operation by the user of the vehicle.

SUMMARY

An object of the present disclosure is to provide a method for avoiding activation of a sailing functionality in a vehicle, a transmission system of a vehicle for avoiding activation of a sailing functionality, and a vehicle comprising a transmission system for avoiding activation of a sailing functionality, where the previously mentioned problems are avoided. This object is at least partly achieved by the features of the independent claims. The dependent claims contain further developments of the method for avoiding activation of a sailing functionality in a vehicle, and the transmission system for avoiding activation of a sailing functionality.

The disclosure concerns a method for avoiding activation of a sailing functionality in a vehicle, where the vehicle comprises a powertrain with a transmission system. The transmission system is configured for automatic gear-shifting in an operational automatic mode and manual gear-shifting by a user of the vehicle in an operational manual mode. The transmission system comprises a user input device configured for manually changing the operational mode of the transmission system between the automatic mode and the manual mode. The transmission system comprises a transmission control unit for determining a recommended gear in the automatic mode and the manual mode. The method comprises the steps: operating the transmission system in the manual mode, and in the manual mode detecting an operating gear of the transmission system by the transmission control unit; detecting a change of the operational mode of the transmission system from the manual mode to the automatic mode by means of the user input device, where if the detected operating gear in the manual mode when changing the operational mode to the automatic mode by means of the user input device is lower than the recommended gear the sailing functionality in the automatic mode is deactivated.

Advantages with these features are that the sailing functionality of the vehicle can be avoided in the automatic mode in an efficient and reliable way through the change of transmission modes. The deactivation of the sailing functionality is allowing a controlled deceleration of the vehicle. There is thus with the method no need for applying brakes, which leads to unnecessary energy consumption, or to drive in the manual mode, for avoiding the sailing functionality.

According to an aspect of the disclosure, the method further comprises the steps: detecting the change of the operational mode of the transmission system by the transmission control unit; and deactivate the sailing functionality in the automatic mode by the transmission control unit when changing the operational mode to the automatic mode by means of the user input device. The transmission control unit is detecting the operational mode of the vehicle, and when the operational mode is changed, the transmission control unit receives a signal that the mode has been changed. When the operational mode is changed to the automatic mode, and the condition that the operating gear in the manual mode is lower than the recommended gear when changing the operational mode to the automatic mode is fulfilled, the transmission control unit is programmed to avoid the activation of the sailing functionality for an efficient and reliable operation.

According to another aspect of the disclosure, the user input device comprises a gear-shifting device. The method further comprises the step: in the manual mode performing a downshifting operation by means of the gear-shifting device for selecting the operating gear lower than the recommended gear. The gear-shifting device may for example be a traditional shift lever or shift paddles arranged in connection to a steering wheel of the vehicle, where the gear-shifting device is operated by the user of the vehicle. Through the downshifting operation, the recommended gear will be higher than the operating gear, and the condition that the operating gear in the manual mode is lower than the recommended gear when changing the operational mode to the automatic mode by means of the user input device is fulfilled in a simple, reliable, and efficient way. The recommended gear may for example be indicated to the user via a suitable interface, such as a graphical indication in connection to the speedometer.

According to an aspect of the disclosure, the method further comprises the step: activating an engine braking functionality of the transmission system through the downshifting operation in the manual mode. When the downshifting operation is initiated, the engine braking functionality is activated for an efficient deceleration of the vehicle.

According to another aspect of the disclosure, the method further comprises the step: in the manual mode initiate an acceleration operation for selecting the operating gear lower than the recommended gear. The acceleration operation may for example be initiated by the user of the vehicle by pushing down the accelerator pedal, or by initiating an acceleration command via a cruise control system, without changing gear. When accelerating, the recommended gear will eventually be higher than the operating gear. The recommended gear may for example be indicated to the user via a suitable interface, such as a graphical indication in connection to the speedometer. Through the downshifting operation or the acceleration operation, the condition that the operating gear in the manual mode is lower than the recommended gear when changing the operational mode to the automatic mode by means of the user input device is fulfilled in a simple, reliable, and efficient way. It should however be understood that this acceleration operation will not work if already driving at the highest gear level.

According to a further aspect of the disclosure, the method further comprises the step: activating an engine braking functionality of the transmission system through aborting the acceleration operation in the manual mode. When the acceleration operation is initiated and then aborted, the engine braking functionality is activated for an efficient deceleration of the vehicle.

According to an aspect of the disclosure, the method further comprises the step: maintaining the engine braking functionality of the transmission system in the automatic mode when changing the operational mode from the manual mode to the automatic mode by means of the user input device. By maintaining the engine braking functionality, an efficient deceleration of the vehicle in the automatic mode is secured.

According to another aspect of the disclosure, the method further comprises the step: selecting the recommended gear in the automatic mode while maintaining the engine braking functionality of the transmission system. In this way, the engine braking functionality is maintained in the automatic mode for an efficient deceleration of the vehicle, even if allowing the transmission to change gear to the recommended gear.

According to a further aspect of the disclosure, the method further comprises the steps: operating the transmission system in the automatic mode before operating the transmission system in the manual mode; changing the operational mode from the automatic mode to the manual mode by means of the user input device, where in the manual mode the transmission control unit is selecting the recommended gear. It is thus possible to first operate the transmission in the automatic mode, and then change to the manual mode, and from the manual mode change back to the automatic mode for avoiding activation of a sailing functionality. In the manual mode, the condition that the operating gear in the manual mode is lower than the recommended gear when changing the operational mode back to the automatic mode needs to be fulfilled in order to avoid the activation of the sailing functionality.

According to an aspect of the disclosure, the method further comprises the step: determining the recommended gear by the transmission control unit based upon driving conditions of the vehicle. The driving conditions of the vehicle may vary depending on different parameters, such as for example vehicle speed, road type, road inclination, and weather conditions. These and other parameters are influencing the torque needed from the engine for the propulsion of the vehicle and thus also the recommended gear. The vehicle control units are collecting relevant information from the powertrain in order to establish the suitable recommended gear depending on the driving conditions of the vehicle.

According to another aspect of the disclosure, the method further comprises the steps: activating the sailing functionality in the automatic mode upon initiation of a user command to the vehicle transmission control unit. If driving with the sailing functionality deactivated, the user of the vehicle may decide to activate the sailing functionality. This may be achieved with a user command to the transmission control unit via a suitable user interface, such as an activation button or switch. In this way, an efficient activation of the sailing functionality is achieved.

According to a further aspect of the disclosure, the user input device is arranged as a shift lever displaceable by the user between an automatic mode position for operating the transmission system in the automatic mode and a manual mode position for operating the transmission system in the manual mode. The method comprises the step: changing the operational mode of the transmission system from the manual mode to the automatic mode by displacing the shift lever from the manual mode position to the automatic mode position, where if the detected operating gear in the manual mode when the shift lever is displaced from the manual mode position to the automatic mode position is lower than the recommended gear the sailing functionality in the automatic mode is deactivated. The use of a shift lever as the user input device is a simple and reliable solution, which also is easy and efficient to operate by the user of the vehicle. The sailing functionality can thus be easily deactivated in the automatic mode by means of the shift lever.

The disclosure further concerns a transmission system of a vehicle for avoiding activation of a sailing functionality. The transmission system is configured for automatic gear-shifting in an automatic mode and manual gear-shifting by a user of the vehicle in a manual mode. The transmission system comprises a user input device configured for manually changing the operational mode of the transmission system between the automatic mode and the manual mode. The transmission system comprises a transmission control unit configured for determining a recommended gear in the automatic mode and the manual mode. Upon operation of the transmission system in the manual mode the transmission control unit is configured for detecting an operating gear of the transmission system. The transmission control unit is configured for deactivating the sailing functionality in the automatic mode upon change of the operational mode from the manual mode to the automatic mode by means of the user input device, if the detected operating gear in the manual mode when changing the operational mode to the automatic mode by means of the user input device is lower than the recommended gear. Advantages with these features are that the sailing functionality of the vehicle can be avoided in the automatic mode in an efficient and reliable way through the change of transmission modes. The deactivation of the sailing functionality is allowing a controlled deceleration of the vehicle. There is thus with the transmission system described no need for applying brakes, which leads to unnecessary energy consumption, or to drive in the manual mode, for avoiding the sailing functionality.

According to an aspect of the disclosure, the user input device comprises a gear-shifting device. The transmission control unit is in the manual mode configured for operating the transmission system with the operating gear lower than the recommended gear through a downshifting operation with the gear-shifting device, or upon initiation of an acceleration operation. The gear-shifting device may for example be a traditional shift lever or shift paddles arranged in connection to a steering wheel of the vehicle, operated by the user of the vehicle. The acceleration operation may for example be initiated by the user by pushing down the accelerator pedal, or by initiating an acceleration command via a cruise control system, without changing gear. In this way, the recommended gear will be higher than the operating gear. The recommended gear may for example be indicated to the user via a suitable interface, such as a graphical indication in connection to the speedometer. Through the downshifting operation or the acceleration operation, the condition that the operating gear in the manual mode is lower than the recommended gear when changing the operational mode to the automatic mode by means of the user input device is fulfilled in a simple, reliable, and efficient way.

According to another aspect of the disclosure, the transmission control unit is configured for activating an engine braking functionality of the transmission system through the downshifting operation in the manual mode, or through an abortion of the acceleration operation in the manual mode. The activation of the engine braking functionality is establishing an efficient deceleration of the vehicle when changing to the automatic mode.

According to a further aspect of the disclosure, the user input device is arranged as a shift lever displaceable by the user between an automatic mode position for operating the transmission system in the automatic mode and a manual mode position for operating the transmission system in the manual mode. The use of a shift lever as the user input device is a simple and reliable solution, which also is easy and efficient to operate by the user of the vehicle. The sailing functionality can be easily deactivated in the automatic mode by means of the shift lever.

The disclosure further concerns a vehicle comprising the transmission system for avoiding activation of a sailing functionality described above.

BRIEF DESCRIPTION OF THE DRAWINGS

The disclosure will be described in detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

The disclosure relates to a transmission system and a method for avoiding activation of a sailing functionality in a vehicle. The method described may for example be computer implemented after input command or commands from a user of the vehicle, as will be further described below. The transmission system is part of a vehicle powertrain. The transmission system is configured with a sailing functionality, also called eco-coasting functionality, when the vehicle is operated in an automatic transmission mode. This sailing functionality allows the combustion engine to be disconnected from the driving wheels in a sailing mode of the vehicle. The sailing mode is activated during deceleration to allow further travel distance and reduced total fuel consumption without accelerator pedal input, and the deceleration rate is reduced since no engine braking is taking place in the sailing mode. Sometimes, a user of the vehicle desires to operate the vehicle without the activation of the sailing functionality.

Figure 1:
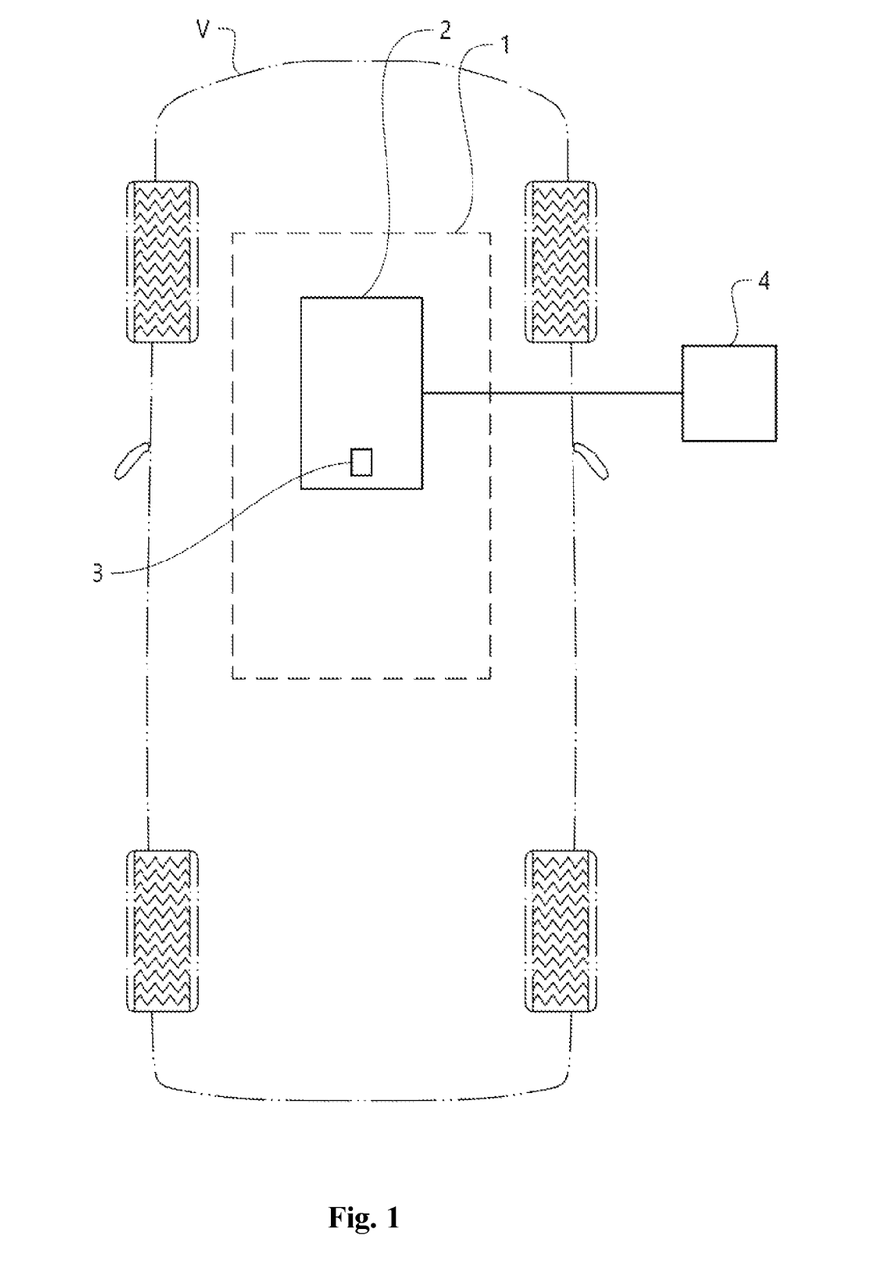
FIG. 1 shows schematically, a layout view of a vehicle with a powertrain comprising a transmission system, according to the disclosure.

FIG. 1 schematically illustrates the vehicle V with a powertrain 1 and the transmission system 2. The transmission system 2 is configured for automatic gear-shifting in an operational automatic mode $M_A$ and manual gear-shifting by a user of the vehicle V in an operational manual mode $M_M$. The transmission system 2 may have any suitable configuration, with the possibility to change between the automatic mode $M_A$ and the manual mode $M_M$. The transmission system 2 comprises a user input device 3 configured for manually changing the operational mode of the transmission system 2 between the automatic mode $M_A$ and the manual mode $M_M$. The transmission system 2 further comprises a transmission control unit 4 for determining a recommended gear $G_R$ in the automatic mode $M_A$ and the manual mode $M_M$. The recommended gear $G_R$ is a gear determined by the transmission control unit 4 based upon the driving conditions of the vehicle. The recommended gear $G_R$ is a gear suitable for the specific driving condition of the vehicle V, and may vary with for example vehicle speed, road type, road inclination, and weather conditions. The recommended gear $G_R$ is suitably indicated to the user of the vehicle with for example graphical display means, such as arrows, symbols, and/or figures, in a heads-up display or other display unit. Based on the recommended gear $R_G$, the user may perform manual shifting operations in the manual mode $M_M$. In the automatic mode $M_A$, the transmission control unit 4 is securing the shifting operations for driving the vehicle V with the recommended gear $G_R$.

The user input device 3 is configured for manually changing the operational mode of the transmission system 2 between the automatic mode $M_A$ and the manual mode $M_M$. The user input device 3 may have any suitable configuration, such a switch, a push button, a shift lever, or other suitable device.

Figure 2A:
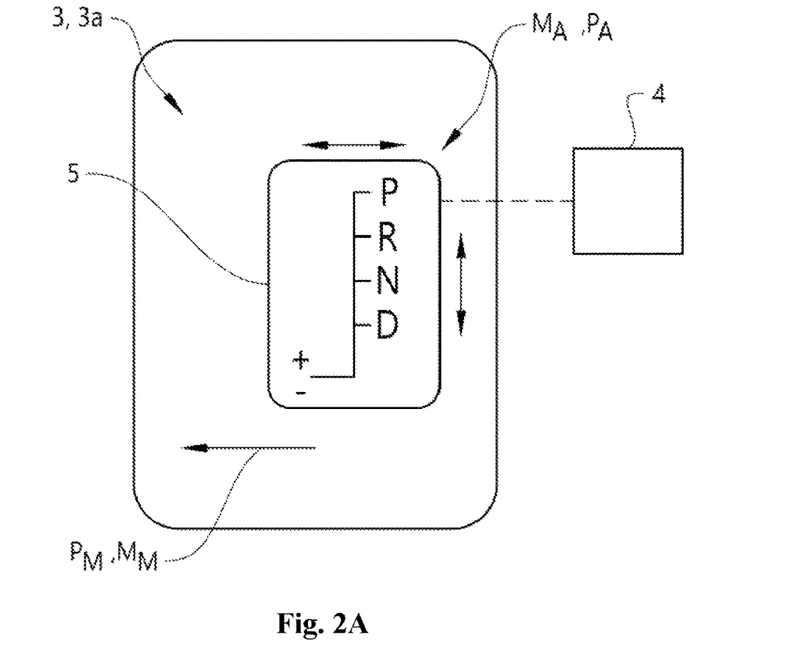
FIG. 2A-2B show schematically, an embodiment of a user input device of the transmission system in an automatic mode and in a manual mode, according to the disclosure.
Figure 2B:
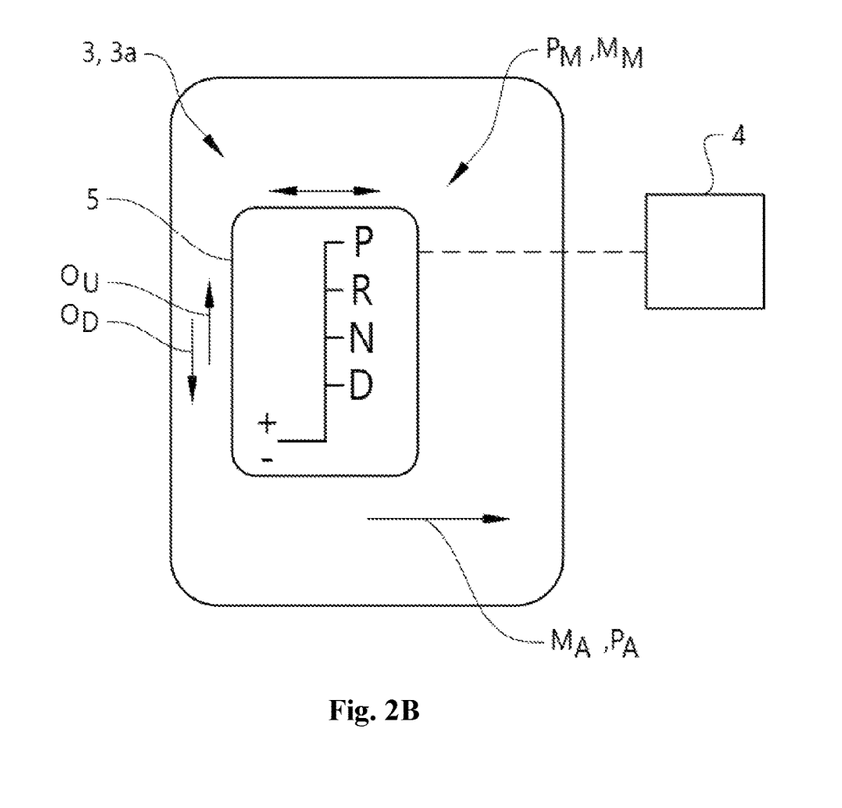

In FIGS. 2A-2B, an example embodiment of a user input device 3 is schematically illustrated, where the user input device 3 comprises a gear-shifting device 3a. In FIGS. 2A-2B, the user input device 3 is arranged as a shift lever 5 having a dual functionality. The shift lever 5 can be used for changing operational modes between the automatic mode $M_A$ and the manual mode $M_M$, and used for performing gear-shifting operations in the manual mode $M_M$. The shift lever 5 is providing a simple and reliable solution that is easy to operate by the user of the vehicle. The shift lever 5 is displaceable by the user between an automatic mode position $P_A$ for operating the transmission system 2 in the automatic mode $M_A$, as shown in FIG. 2A, and a manual mode position $P_M$ for operating the transmission system 2 in the manual mode $M_M$, as shown in FIG. 2B. In the manual mode position $P_M$, the shift lever 5 has the function of the gear-shifting device 3a. In the manual position $P_M$, the shift lever 5 is displaceable for performing gear-shifting operations. In the illustrated embodiment, the shift lever 5 is displaced sideways between the automatic mode position $P_A$ and the manual mode position $P_M$ for changing between the automatic mode $M_A$ and the manual mode $M_M$, as indicated with a double arrow. In the manual mode position $P_M$, the shift lever 5 can be pushed upwards or downwards from an initial shift lever position. The shift lever 5 is suitably spring suspended for returning to the initial shift lever position after an upwards or downwards movement for changing gears. In the illustrated embodiment, an upshifting operation $O_U$ of the transmission system 2 is performed in the manual mode $M_M$ when the shift lever 5 is pushed upwards, as indicated with a plus sign, and a downshifting operation $O_D$ is performed when the shift lever 5 is pushed downwards, as indicated with a minus sign. In the automatic mode position $P_A$, the shift lever 5 may be displaced between different gear modes, such as parking mode, forward driving mode, neutral mode, and reverse driving mode, as indicated with the letters P, R, N, and D, in FIGS. 2A-2B. The shift lever 5 is suitably arranged for a displacement between the automatic mode position $P_A$ and the manual mode position $P_M$, after an initial displacement of the shift lever 5 from the parking mode, P, the neutral mode, N, or the reverse driving mode, R, to the forward driving mode, D.

Figure 3:
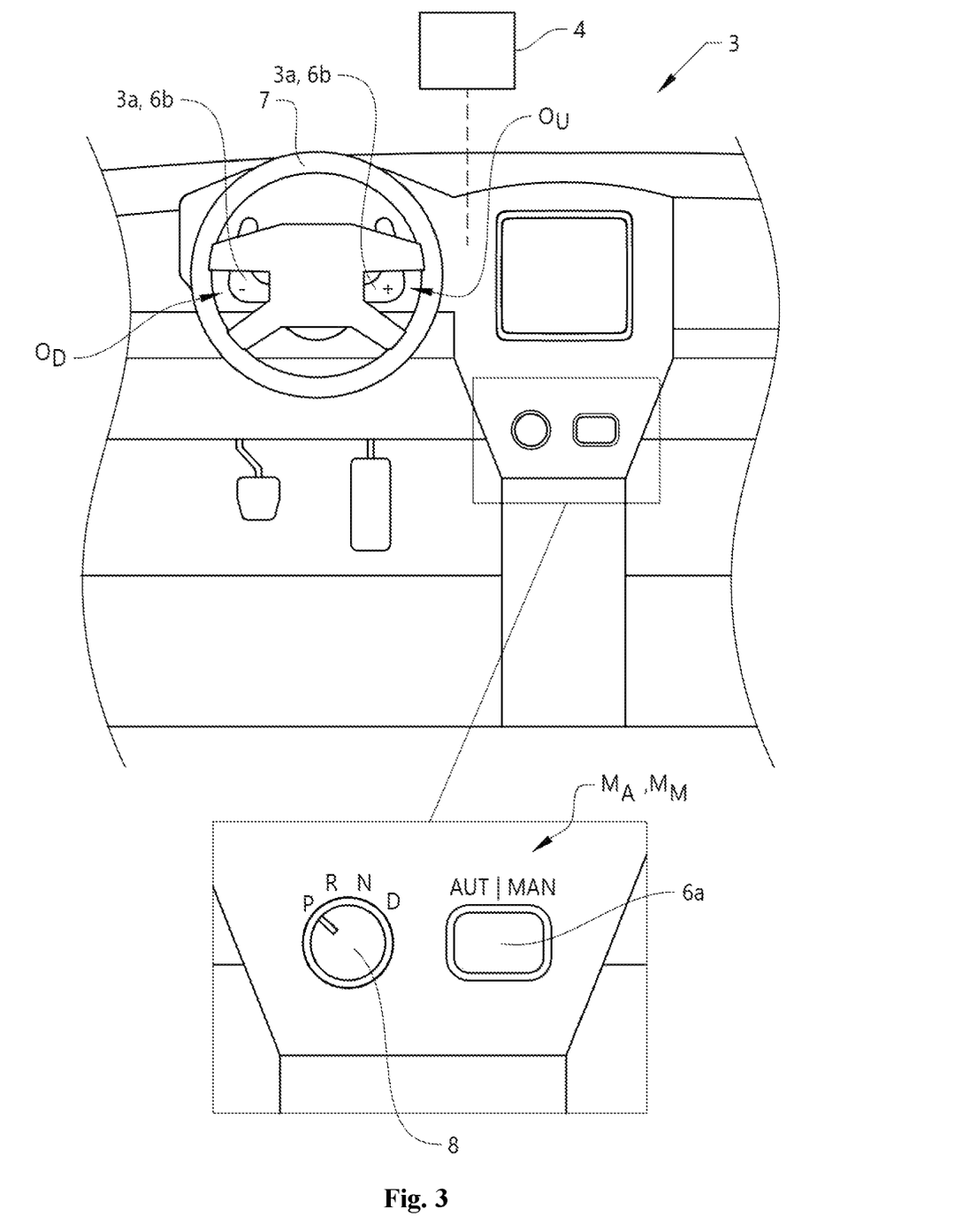
FIG. 3 shows schematically, an alternative embodiment of a user input device of the transmission system, according to the disclosure.

In FIG. 3, an alternative example embodiment of the user input device 3 is schematically illustrated, where the user input device 3 comprises a gear-shifting device 3a. In FIG. 3, the user input device 3 is arranged as a mode-selecting device 6a, and shift paddles 6b, where the shift paddles 6b suitably are arranged in connection to a steering wheel 7 of the vehicle V. The mode-selection device 6a may for example be configured as a push button, and is used for changing operational modes between the automatic mode $M_A$ and the manual mode $M_M$. The shift paddles 6b are used for performing gear-shifting operations in the manual mode $M_M$. The functionality of the mode-selection device 6a may for example be arranged for a mode shifting operation when the user of the vehicle is actuating the mode-selection device 6a, for example by a manual push movement. Every time the mode-selection device 6a is actuated by the user, the transmission system mode is alternately changing between the automatic mode $M_A$ and the manual mode $M_M$. Other switches than a push button may also be used, depending on the construction of the transmission system 2. The shift paddles 6b are used for changing gears when driving in the manual mode $M_M$. The vehicle may be arranged with a left side shift paddle 6b in connection to the steering wheel for a downshifting operation $O_D$, as indicated with a minus sign, and a right side shift paddle 6b in connection to the steering wheel for an upshifting operation $O_U$, as indicated with a plus sign. Each shift paddle 6b can be displaced for performing the gear-shifting operations. Each shift paddle 6b is suitably spring suspended for returning to an initial shift paddle position after for example a pulling movement towards the user for changing gears. In the illustrated embodiment, the upshifting operation $O_U$ is performed in the manual mode $M_M$ when the right shift paddle 6b is being pulled by the user, and the downshifting operation $O_D$ is performed when the left shift paddle 6b is being pulled. In addition, the transmission system 2 may, in this embodiment, comprise a gear selector 8 arranged as for example a twist actuator or other suitable selector means. The gear selector 8 may be displaced between different gear modes, such as parking mode, forward driving mode, neutral mode, and reverse driving mode, as indicated with the letters P, R, N, and D, in FIG. 3. The gear selector 8 is suitable arranged in the forward driving mode, D after an initial displacement of the gear selector 8 from the parking mode, P, the neutral mode, N, or the reverse driving mode, R, before the mode-selection device 6a can be operated for changing operational modes between the automatic mode $M_A$ and the manual mode $M_M$.

When the transmission system 2 is operated in the manual mode $M_M$, the transmission control unit 4 is configured for detecting an operating gear $G_O$ of the transmission system 2. The operating gear $G_O$ is the gear selected manually by the user of the vehicle V with the gear-shifting device 3a. The operating gear $G_O$ may thus be a gear different from the recommended gear $G_R$, since the user may decide to select a gear higher or lower than the recommended gear $G_R$ depending on the driving conditions of the vehicle V. A sporty driving style by the user may for example result in a gear selection lower than the recommended gear $G_R$ for fast accelerations and efficient engine braking operations in the manual mode $M_M$.

The transmission control unit 4 of the transmission system 2 is configured for determining the recommended gear $G_R$ in the automatic mode $M_A$ and the manual mode $M_M$. Upon operation of the transmission system 2 in the manual mode $M_M$ the transmission control unit 4 is configured for detecting an operating gear $G_O$ of the transmission system 2, wherein the transmission control unit 4 is configured for deactivating the sailing functionality $F_S$ in the automatic mode $M_A$ upon change of the operational mode from the manual mode $M_M$ to the automatic mode $M_A$ by means of the user input device 3, if the detected operating gear $G_O$ in the manual mode $M_M$ when changing the operational mode to the automatic mode $M_A$ by means of the user input device 3 is lower than the recommended gear $G_R$.

To avoid the activation of the sailing functionality $F_S$, the transmission system 2 is operated in the manual mode $M_M$. The user of the vehicle has therefore selected the manual mode $M_M$ with the user input device 3, as for example described in the different embodiments above. In the manual mode $M_M$, the operating gear $G_O$ of the transmission system 2 is detected by the transmission control unit 4. The transmission control unit 4 is also calculating the recommended gear $G_R$. When the user of the vehicle V is changing the operational mode of the transmission system 2 from the manual mode $M_M$ to the automatic mode $M_A$ by means of the user input device 3, this change of operational mode is detected by the transmission control unit 4. In this case, since the transmission system is operated in the manual mode $M_M$, the transmission control unit 4 is detecting a change from the manual mode $M_M$ to the automatic mode $M_A$. However, the transmission control system 4 is also configured for detecting a change from the automatic mode $M_A$ to the manual mode $M_M$. When a change of the operational mode of the transmission system 2 from the manual mode $M_M$ to the automatic mode $M_A$ by means of the user input device 3 is detected by the transmission control unit 4, also the operating gear $G_O$ in the manual mode $M_M$ when changing the operational mode to the automatic mode $M_A$ is detected by the transmission control unit 4. If the detected operating gear $G_O$ in the manual mode $M_M$ when changing the operational mode to the automatic mode $M_A$ by means of the user input device 3 is lower than the recommended gear $G_R$, the sailing functionality $F_S$ in the automatic mode $M_A$ is deactivated. The change of the operational mode of the transmission system 2 is thus detected by the transmission control unit 4, and the transmission control unit 4 is deactivating the sailing functionality $F_S$ in the automatic mode $M_A$, when the operational mode is changed to the automatic mode $M_A$ by means of the user input device 3.

The transmission system 2 is in the embodiment illustrated in FIGS. 2A-2B configured to change the operational mode from the manual mode $M_M$ to the automatic mode $M_A$ by displacing the shift lever 5 from the manual mode position $P_M$ to the automatic mode position $P_A$. If the detected operating gear $G_O$ in the manual mode $M_M$ when the shift lever 5 is displaced from the manual mode position $P_M$ to the automatic mode position $P_A$ is lower than the recommended gear $G_R$ the sailing functionality $F_S$ in the automatic mode $M_A$ is deactivated.

The transmission system 2 is in the embodiment illustrated in FIG. 3 configured to change the operational mode from the manual mode $M_M$ to the automatic mode $M_A$ by actuation of the mode-selecting device 6a. If the detected operating gear $G_O$ in the manual mode $M_M$ when mode-selecting device 6a is actuated is lower than the recommended gear $G_R$ the sailing functionality $F_S$ in the automatic mode $M_A$ is deactivated.

With this functionality of the system, the user of the vehicle V can in a simple and reliable way avoid the activation of the sailing functionality $F_S$ in the automatic mode $M_A$, by securing that the operating gear $G_O$ is lower than the recommended gear $G_R$ when changing the operational mode of the transmission system 2 from the manual mode $M_M$ to the automatic mode $M_A$. To secure that the transmission system 2 is operated with an operating gear $G_O$ lower than the recommended gear $G_R$ in the manual mode $M_M$, the user of the vehicle V has different available options. In the manual mode $M_M$ the user may as one alternative perform a downshifting operation $O_D$ by means of the gear-shifting device 3a for selecting the operating gear $G_O$ lower than the recommended gear $G_R$. Through the downshifting operation $O_D$ in the manual mode $M_M$, an engine braking functionality $F_{EB}$ of the transmission system 2 could be activated. As another alternative, the user may initiate an acceleration operation $O_A$ for selecting the operating gear $G_O$ lower than the recommended gear $G_R$ in the manual mode $M_M$. The acceleration operation may for example be initiated by the user by pushing down an accelerator pedal without changing gear, or alternatively by initiating an acceleration command via a cruise control system without changing gear. An engine braking functionality $F_{EB}$ of the transmission system 2 could in this case be activated through aborting the acceleration operation $O_A$ in the manual mode $M_M$. It should however be understood that the selection of an operating gear $G_O$ lower than the recommended gear $G_R$ through the acceleration operation $O_A$ is not available if the transmission system 2 is already operated in the highest available gear by the user in the manual mode $M_M$. If the transmission system 2 is designed with eight available forward gears and the transmission system 2 in the manual mode $M_M$ is operated in the highest eighth gear, when for example driving on a highway at high speed, the eighth gear is the operating gear $G_O$. If further accelerating the vehicle V, the operating gear will be the eight gear $G_O$, and the recommended gear $G_R$ could never be higher than the eight gear.

In the embodiments described above, the user input device 3 comprises the gear-shifting device 3a, and the transmission control unit 4 is in the manual mode $M_M$ configured for operating the transmission system 2 with the operating gear $G_O$ lower than the recommended gear $G_R$ through the downshifting operation $O_D$ with the gear-shifting device 3a, or upon initiation of an acceleration operation $O_A$. The transmission control unit 4 is further configured for activating the engine braking functionality $F_{EB}$ of the transmission system 2 through the downshifting operation $O_D$ in the manual mode $M_M$, or through the abortion of the acceleration operation $O_A$ in the manual mode $M_M$.

The transmission system 2 may further have a configuration where the engine braking functionality $F_{EB}$ of the transmission system 2 is maintained in the automatic mode $M_A$ when changing the operational mode from the manual mode $M_M$ to the automatic mode $M_A$ by means of the user input device 3. The transmission system may also be configured to select the recommended gear $G_R$ in the automatic mode $M_A$ while maintaining the engine braking functionality $F_{EB}$ of the transmission system 2.

The deactivation of the sailing functionality $F_S$ may be initiated as described above in the user of the vehicle V is already driving in the automatic mode $M_A$ by simply entering the manual mode $M_M$ and the perform the deactivation process described above. The transmission system 2 is thus operated in the automatic mode $M_A$ before operating the transmission system 2 in the manual mode $M_M$, and the operational mode of the transmission system 2 is changed from the automatic mode $M_A$ to the manual mode $M_M$ by means of the user input device 3. When changing to the manual mode $M_M$ the transmission control unit 4 is selecting the recommended gear $G_R$, and the user could thereafter operate the vehicle V in a gear lower than the recommended gear $G_R$, through for example a downshifting operation $O_D$ or alternatively an acceleration operation $O_A$.

In an alternative non-illustrated embodiment, it would be possible when driving in the automatic mode $M_A$ with the sailing functionality $F_S$ deactivated, to activate the sailing functionality $F_S$ upon initiation of a user command to the vehicle transmission control unit 4. The transmission system 2 may for example be arranged with a suitable user input interface in communication with the transmission control unit 4, such as for example a push button or similar device for activating the sailing functionality $F_S$ via a command from the user input device. The user of the vehicle V may thus through the user command activate the sailing functionality $F_S$ by simply pushing the user input device.

Figure 4:
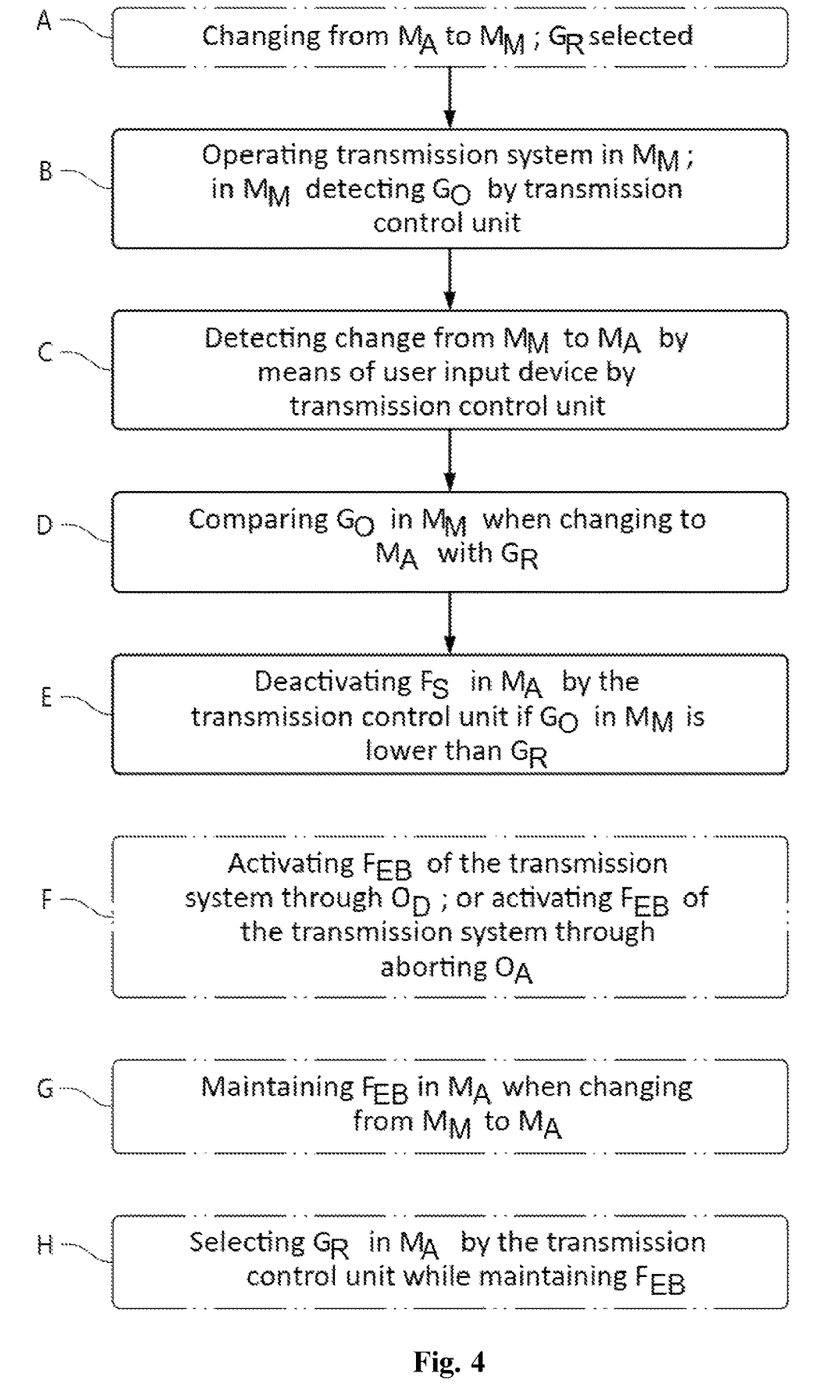
FIG. 4 shows schematically, a flowchart of exemplified method steps for the operation of the transmission system, according to the disclosure.

A flowchart of an exemplified method for operating the transmission system 2 with the user input device 3 is shown in FIG. 4. The exemplified method comprises the steps described below with reference to FIG. 4.

The transmission system 2 with the user input device 3 in the exemplified method may have the configurations described above and illustrated in FIGS. 1-3, where the transmission system 2 of the vehicle V for avoiding activation of the sailing functionality $F_S$, and the transmission system 2 is configured for automatic gear-shifting in the automatic mode $M_A$ and manual gear-shifting by the user of the vehicle V in the manual mode $M_M$. The transmission system 2 comprises the user input device 3, configured for example as presented in the different embodiments described, and the user input device 3 is used for manually changing the operational mode of the transmission system 2 between the automatic mode $M_A$ and the manual mode $M_M$.

In step B, the transmission system 2 is operated in the manual mode $M_M$, and in the manual mode $M_M$ the operating gear $G_O$ is detected by the transmission control unit 4.

In step C, a change of the operational mode of the transmission system 2 from the manual mode $M_M$ to the automatic mode $M_A$ by means of the user input device 3 is detected by the transmission control unit 4.

In step D, the transmission control unit 4 is comparing the detected operating gear $G_O$ in the manual mode $M_M$ when changing the operational mode to the automatic mode $M_A$ by means of the user input device 3, with the recommended gear $G_R$.

In step E, the sailing functionality $F_S$ in the automatic mode $M_A$ is deactivated by the transmission control unit 4 if the detected operating gear $G_O$ in the manual mode $M_M$ is lower than the recommended gear $G_R$.

In step A, the transmission system 2 is operated in the automatic mode $M_A$ before being operated in the manual mode $M_M$ as described in step B, and in step A the operational mode is changed from the automatic mode $M_A$ to the manual mode $M_M$ by means of the user input device 3. In the manual mode $M_M$, the transmission control unit 4 is selecting the recommended gear $G_R$, and the user is thereafter allowed to operate the transmission system 2 manually.

Step F may form part of step B if desired, when the transmission system 2 is operated in the manual mode $M_M$. In step F, if in the manual mode $M_M$ a downshifting operation $O_D$ is performed by the user by means of the gear-shifting device 3a for selecting the operating gear $G_O$ lower than the recommended gear $G_R$, an engine braking functionality $F_{EB}$ of the transmission system 2 is activated through the downshifting operation $O_D$; or if in the manual mode $M_M$ an acceleration operation $O_A$ is initiated by the user for selecting the operating gear $G_O$ lower than the recommended gear $G_R$, an engine braking functionality $F_{EB}$ of the transmission system 2 is activated through aborting the acceleration operation $O_A$. This step is thus activating the engine braking functionality $F_{EB}$ in the manual mode $M_M$.

Step G is forming part of step E when step F is fulfilled in the manual mode $M_M$. In step G, the engine braking functionality $F_{EB}$ of the transmission system 2 is maintained in the automatic mode $M_A$ when changing the operational mode from the manual mode $M_M$ to the automatic mode $M_A$ by means of the user input device 3. This step is thus maintaining the engine braking functionality $F_{EB}$. By maintaining the engine braking functionality $F_{EB}$, an efficient deceleration of the vehicle V in the automatic mode $M_A$ is secured.

Step H may form part of step G. In step H, the recommended gear $G_R$ is selected in the automatic mode $M_A$ by the transmission control unit 4 while maintaining the engine braking functionality $F_{EB}$ of the transmission system 2. In this way, the engine braking functionality $F_{EB}$ is maintained in the automatic mode $M_A$ for an efficient deceleration of the vehicle V, even if allowing the transmission 2 to change gear to the recommended gear $G_R$.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of the transmission system 2 with the transmission control unit 4, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products. Moreover, the processor may be connected to one or more communication interfaces and/or sensor interfaces for receiving and/or transmitting data with external entities such as e.g. sensors arranged on the vehicle surface, an off-site server, or a cloud-based server.

The processor or processors associated with the transmission system 2 and the transmission control unit 4 may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Powertrain
2: Transmission system
3: User input device
3a: Gear-shifting device
4: Transmission control unit
5: Shift lever
6a: Mode-selection device
6b: Shift paddle
7: Steering wheel
8: Gear selector
$F_{EB}$: Engine braking functionality
$F_S$: Sailing functionality
$G_O$: Operating gear
$G_R$: Recommended gear
$M_A$: Automatic mode
$M_M$: Manual mode
$O_A$: Acceleration operation
$O_D$: Downshifting operation
$O_U$: Upshifting operation
$P_A$: Automatic mode position
$P_M$: Manual mode position
V: Vehicle

What is claimed is:

1. A method for avoiding activation of a sailing functionality in a vehicle,
    wherein the vehicle comprises a powertrain with a transmission system, wherein the transmission system is configured for automatic gear-shifting in an operational automatic mode and manual gear-shifting by a user of the vehicle in an operational manual mode, wherein the transmission system comprises a user input device configured for manually changing the operational mode of the transmission system between the automatic mode and the manual mode, wherein the transmission system comprises a transmission control unit for determining a recommended gear in the automatic mode and the manual mode, wherein the method comprises the steps:
    operating the transmission system in the manual mode, and in the manual mode detecting an operating gear of the transmission system by the transmission control unit;
    detecting a change of the operational mode of the transmission system from the manual mode to the automatic mode by means of the user input device, wherein if the detected operating gear in the manual mode when changing the operational mode to the automatic mode by means of the user input device is lower than the recommended gear the sailing functionality in the automatic mode is deactivated.

2. The method according to claim 1,
    wherein the method further comprises the steps: detecting the change of the operational mode of the transmission system by the transmission control unit; and deactivating the sailing functionality in the automatic mode by the transmission control unit when changing the operational mode to the automatic mode by means of the user input device.

3. The method according to claim 1,
    wherein the user input device comprises a gear-shifting device, wherein the method further comprises the step: in the manual mode performing a downshifting operation by means of the gear-shifting device for selecting the operating gear lower than the recommended gear.

4. The method according to claim 3,
    wherein the method further comprises the step: activating an engine braking functionality of the transmission system through the downshifting operation in the manual mode.

5. The method according to claim 4,
    wherein the method further comprises the step: maintaining the engine braking functionality of the transmission system in the automatic mode when changing the operational mode from the manual mode to the automatic mode by means of the user input device.

6. The method according to claim 5,
    wherein the method further comprises the step: selecting the recommended gear in the automatic mode while maintaining the engine braking functionality of the transmission system.

7. The method according to claim 1,
    wherein the method further comprises the step: in the manual mode initiate an acceleration operation for selecting the operating gear lower than the recommended gear.

8. The method according to claim 7,
    wherein the method further comprises the step: activating an engine braking functionality of the transmission system through aborting the acceleration operation in the manual mode.

9. The method according to claim 1,
    wherein the method further comprises the steps: operating the transmission system in the automatic mode before operating the transmission system in the manual mode; changing the operational mode from the automatic mode to the manual mode by means of the user input device, wherein in the manual mode the transmission control unit is selecting the recommended gear.

10. The method according to claim 1,
    wherein the method further comprises the step: determining the recommended gear by the transmission control unit based upon driving conditions of the vehicle.

11. The method according to claim 1,
    wherein the method further comprises the steps: activating the sailing functionality in the automatic mode upon initiation of a user command to the vehicle transmission control unit.

12. The method according to claim 1,
    wherein the user input device is arranged as a shift lever displaceable by the user between an automatic mode position for operating the transmission system in the automatic mode and a manual mode position for operating the transmission system in the manual mode, wherein the method comprises the step:

changing the operational mode of the transmission system from the manual mode to the automatic mode by displacing the shift lever from the manual mode position to the automatic mode position, wherein if the detected operating gear in the manual mode when the shift lever is displaced from the manual mode position to the automatic mode position is lower than the recommended gear the sailing functionality in the automatic mode is deactivated.

13. A transmission system of a vehicle for avoiding activation of a sailing functionality,
wherein the transmission system is configured for automatic gear-shifting in an automatic mode and manual gear-shifting by a user of the vehicle in a manual mode, wherein the transmission system comprises a user input device configured for manually changing the operational mode of the transmission system between the automatic mode and the manual mode, wherein the transmission system comprises a transmission control unit configured for determining a recommended gear in the automatic mode and the manual mode,
wherein upon operation of the transmission system in the manual mode the transmission control unit is configured for detecting an operating gear of the transmission system,
wherein the transmission control unit is configured for deactivating the sailing functionality in the automatic mode upon change of the operational mode from the manual mode to the automatic mode by means of the user input device, if the detected operating gear in the manual mode when changing the operational mode to the automatic mode by means of the user input device is lower than the recommended gear.

14. The transmission system according to claim 13,
wherein the user input device comprises a gear-shifting device, wherein the transmission control unit in the manual mode is configured for operating the transmission system with the operating gear lower than the recommended gear through a downshifting operation with the gear-shifting device, or upon initiation of an acceleration operation.

15. The transmission system according to claim 14,
wherein the transmission control unit is configured for activating an engine braking functionality of the transmission system through the downshifting operation in the manual mode, or through an abortion of the acceleration operation in the manual mode.

16. The transmission system according to claim 13,
wherein the user input device is arranged as a shift lever displaceable by the user between an automatic mode position for operating the transmission system in the automatic mode and a manual mode position for operating the transmission system in the manual mode.

17. A vehicle comprising the transmission system for avoiding activation of a sailing functionality according to claim 13.

* * * * *